(12) United States Patent
Bruinsma et al.

(10) Patent No.: US 10,167,400 B2
(45) Date of Patent: *Jan. 1, 2019

(54) WHITE INKS

(71) Applicant: Hewlett-Packard Development Company, L.P., Fort Collins, CO (US)

(72) Inventors: Paul Joseph Bruinsma, San Diego, CA (US); Vladek Kasperchik, Corvallis, OR (US); Thomas W. Butler, Corvallis, OR (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/544,301

(22) PCT Filed: Apr. 27, 2015

(86) PCT No.: PCT/US2015/027833
§ 371 (c)(1),
(2) Date: Jul. 18, 2017

(87) PCT Pub. No.: WO2016/175749
PCT Pub. Date: Nov. 3, 2016

(65) Prior Publication Data
US 2017/0369722 A1 Dec. 28, 2017

(51) Int. Cl.
*C09D 11/322* (2014.01)
*C09D 11/102* (2014.01)
(Continued)

(52) U.S. Cl.
CPC ............ *C09D 11/322* (2013.01); *C09D 11/03* (2013.01); *C09D 11/102* (2013.01);
(Continued)

(58) Field of Classification Search
CPC ...... C09D 11/322; C09D 11/03; C09D 11/107
(Continued)

(56) References Cited

U.S. PATENT DOCUMENTS 5,972,087 A 10/1999 Uraki et al.
7,026,368 B2 4/2006 Yamada et al.
(Continued)

FOREIGN PATENT DOCUMENTS

EP 1258510 11/2002
EP 1388578 2/2004
(Continued)

OTHER PUBLICATIONS

International Search Report and Written Opinion dated Sep. 25, 2015 for PCT/US2015/027833; Applicant Hewlett-Packard Development Company L.P.

*Primary Examiner* — William K Cheung
(74) *Attorney, Agent, or Firm* — Thorpe North & Western LLP (57) ABSTRACT

The present disclosure provides a white ink including an aqueous ink vehicle, from 5 wt % to 50 wt % of a white metal oxide pigment having an average particulate size from 100 nm to 2,000 nm, from 0.02 wt % to 2 wt % of an anionic low molecular weight polymer having a weight average molecular weight of 3,000 Mw to 50,000 Mw and an acid number higher than 100 mg KOH/g based on dry polymer weight, and from 2 wt % to 30 wt % of latex particulates having a glass transition temperature from 0 C to 130 C. Furthermore, the white metal oxide pigment is dispersed by a non-ionic or predominantly non-ionic dispersant having an acid number not higher than 100 mg KOH/g based on dry polymer weight.

20 Claims, 3 Drawing Sheets

(51) Int. Cl.
*C09D 11/326* (2014.01)
*C09D 11/54* (2014.01)
*C09D 11/03* (2014.01)
*C09D 11/107* (2014.01)

(52) U.S. Cl.
CPC .......... *C09D 11/107* (2013.01); *C09D 11/326* (2013.01); *C09D 11/54* (2013.01)

(58) Field of Classification Search
USPC ........................................................ 524/265
See application file for complete search history.

(56) References Cited

U.S. PATENT DOCUMENTS

| | | |
|---|---|---|
| 7,622,513 B2 | 11/2009 | Sarkisian et al. |
| 7,635,504 B2 | 12/2009 | Elwakil et al. |
| 7,850,774 B2 | 12/2010 | Oriakhi |
| 8,198,391 B2 | 6/2012 | Itoya et al. |
| 8,318,120 B2 | 11/2012 | Nelson et al. |
| 8,404,761 B2 | 3/2013 | Shinozaki et al. |
| 8,449,097 B2 | 5/2013 | Nishimura et al. |
| 8,466,213 B2 | 6/2013 | Ueno et al. |
| 8,512,827 B2 | 8/2013 | Seguchi et al. |
| 8,617,302 B2 | 12/2013 | Okuda et al. |
| 8,771,556 B2 | 7/2014 | Kim et al. |
| 8,783,842 B2 | 7/2014 | Ingle et al. |
| 8,784,508 B2 | 7/2014 | Ellis |
| 8,784,550 B2 | 7/2014 | Kasperchik et al. |
| 2004/0063808 A1 | 4/2004 | Ma et al. |
| 2005/0231573 A1 | 10/2005 | Bruinsma et al. |
| 2006/0155005 A1 | 7/2006 | Kondo et al. |
| 2007/0200794 A1* | 8/2007 | Mueller .................. B41J 3/407 345/55 |
| 2010/0047456 A1 | 2/2010 | Kariya |
| 2010/0190922 A1 | 7/2010 | Shinozaki et al. |
| 2010/0222492 A1 | 9/2010 | Sarkisian et al. |
| 2010/0231671 A1 | 9/2010 | Anton et al. |
| 2013/0092049 A1 | 4/2013 | Lee et al. |
| 2013/0155160 A1 | 6/2013 | Shiono |
| 2013/0202858 A1 | 8/2013 | Shimohara |
| 2013/0224451 A1 | 8/2013 | Shiono et al. |
| 2014/0118449 A1 | 5/2014 | Sarkisian et al. |
| 2014/0123874 A1 | 5/2014 | Kabalnov et al. |
| 2014/0170395 A1 | 6/2014 | Kasperchik et al. |
| 2014/0288208 A1 | 9/2014 | Sasada et al. |
| 2014/0352573 A1 | 12/2014 | Kasperchik et al. |
| 2014/0354740 A1 | 12/2014 | Smet et al. |

FOREIGN PATENT DOCUMENTS

| | | |
|---|---|---|
| EP | 2206753 | 7/2010 |
| EP | 2599841 | 6/2013 |
| JP | 2002038063 | 2/2002 |
| JP | 2014214221 | 11/2014 |
| WO | 2006049012 | 5/2006 |
| WO | 2007035505 | 3/2007 |
| WO | 2009053302 | 4/2009 |
| WO | 2012009415 | 1/2012 |
| WO | 2012054052 | 4/2012 |
| WO | 2012170032 | 12/2012 |
| WO | 2013162513 | 10/2013 |
| WO | 2014042652 | 3/2014 |
| WO | 2014066608 | 5/2014 |
| WO | 2014135843 | 9/2014 |
| WO | 2014193387 | 12/2014 |

* cited by examiner

WHITE INKS

This application is a 35 U.S.C. 371 national stage entry application of International Patent Application Serial No. PCT/US2015/027833, filed 27 Apr. 2015.

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at lower costs than comparable products available just a few years ago. Notwithstanding their recent success, research and development efforts continue toward improving ink-jet print quality over a wide variety of different applications.

An ink-jet image is formed when a precise pattern of dots is ejected from a drop-generating device known as a "printhead" onto a printing medium. Inks normally used in ink-jet recording are sometimes composed of water-soluble organic solvents, surfactants, and colorants in a predominantly aqueous fluid. Regarding the use of colorants, certain pigments can be more challenging than other in achieving certain desirable properties. For example, ink opacity, durability, and uniformity can be a challenge in certain circumstances.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Reference will now be made to the certain examples illustrated, and specific language will be used herein to describe the same. It will nevertheless be understood that no limitation of the scope of the disclosure is thereby intended.

DETAILED DESCRIPTION

The present disclosure is drawn to white inks, namely water-based white inkjet inks that can be jetted from various types of inkjet printheads, but can be particularly friendly for use in thermal inkjet printheads. These inks, in some instances with the assistance of a fixer coating layer or fixer ink, can be printed not only on porous media, but also effectively on more challenging non-porous polymer media.

In accordance with this, it has been realized that white metal oxide pigments (e.g., zinc oxide, titanium dioxide such as rutile or anatase, zirconium oxide, etc.) can be dispersed and effectively jetted from thermal inkjet printheads with non-ionic or predominantly non-ionic dispersants. Unfortunately, these types of dispersions also tend to produce coating of non-uniform thickness when dried on non-porous substrates, which ultimately leads to poor quality prints. Thus, the essence of the present disclosure is prepare inkjet ink formulation based on non-ionically stabilized white metal oxide pigment dispersions, and introduce into the formulation a comparatively small amount of water-soluble anionic polymer (in addition to the dispersant).

Once formulated, these white inks work well when printed with cationic fixer layers applied to media substrates (either by inkjet application or analog application). Thus, the white ink formulations described herein can be jetted onto a pretreated or essentially simultaneously treated media surface. Mixing of the white ink with cationic fixer on print surface leads to essentially instant formation of polyelectrolyte complex (PEC) in the mixed liquid phase. PECs are the association complexes formed between oppositely charged dissolved polymer chains, and in the instance case, comprise anionic polymer dissolved in white ink and cationic polymer dissolved in the fixer, for example. In further detail, the PEC is formed due to electrostatic interaction between oppositely charged polyions. The PECs formed by poly acid and poly base interaction may often only be minimally affected by the pH variation of the dissolution medium, and their formation can result in continuous fixed entanglement of cationic and anionic polymer chains through the mixed ink/fixer liquid phase, providing increases in effective viscosity. Thus, the PEC formation effectively freezes the ink/fixer mixture and prevents pigment shifting which is often characteristic of pigment layer non-uniformity that can occur during print drying.

In accordance with examples of the present disclosure, the white ink formulations of the present disclosure can include an aqueous ink vehicle and from 5 wt % to 50 wt % of a white metal oxide pigment having an average particulate size from 100 nm to 2,000 nm. The white metal oxide pigment can be dispersed by a non-ionic or predominantly non-ionic dispersant having an acid number not higher than 100 mg KOH/g based on dry polymer weight. The white ink can further comprise from 0.02 wt % to 2 wt % of an anionic low molecular weight polymer having a weight average molecular weight of 3,000 Mw to 50,000 Mw and an acid number higher than 100 mg KOH/g based on dry polymer weight. The ink can also include from 2 wt % to 30 wt % of latex particulates having a glass transition temperature from 0° C. to 130° C.

In another example, a method of making a white ink can include milling a white metal oxide pigment in a water-based carrier with a non-ionic or predominantly non-ionic dispersing agent to form a white metal oxide pigment dispersion, wherein the non-ionic or predominantly non-ionic dispersant is defined by having an acid number not higher than 100 mg KOH/g based on dry polymer weight. Additionally, the method can include admixing with the white metal oxide pigment dispersion: water, organic co-solvent, anionic low molecular weight polymer having a weight average molecular weight of 3,000 Mw to 50,000

Mw and an acid number higher than 100 mg KOH/g based on dry polymer weight, and latex particulates, thereby forming a white ink.

In another example, a white thermal inkjet ink can include an aqueous inkjet ink vehicle, a $TiO_2$ pigment, and an anionic low molecular weight polymer. The $TiO_2$ pigment can be present at from 10 wt % to 35 wt % and can have an average particulate size from 150 nm to 500 nm. The $TiO_2$ pigment can also be dispersed by a non-ionic or predominantly non-ionic dispersant having an acid number not higher than 30 mg KOH/g based on dry polymer weight. The anionic low molecular weight polymer can be present at from 0.02 wt % to 2 wt % and can have a weight average molecular weight of 3,000 Mw to 50,000 Mw as well as an acid number higher than 150 mg KOH/g based on dry polymer weight.

These white inks can be used in forming white images on various media substrate, including smooth polymer (non-porous) media substrate, and can be printed in combination with a fixer coated on the surface of the media. For example, a fixer with cationic polymer can be applied to the media substrate and can be formulated so that its cationic polymer interacts with the anionic low molecular weight polymer to immobilize the white metal oxide pigment.

In each of these examples, there are several advantages related to the inclusion of the anionic low molecular weight polymer (e.g., 3,000 Mw to 50,000 Mw, or 3,000 Mw to 25,000 Mw, or from 4,000 Mw to 10,000 Mw) along with a more dominant concentration of the white metal oxide pigment. The addition of anionic low molecular weight polymer provides a relatively strong to very strong electrostatic interaction with cationic polymer that may be present on the media substrate, or as part of a fixer fluid to be printed (digitally) or otherwise applied (analog application) on a media substrate. The negative charge and relatively low weight of these anionic low molecular weight polymer provide a way of fixing relatively thick ink layer on a smooth polymer surface for drying and/or subsequent heat fusing, while at the same time, not raising the viscosity of the ink too much, e.g., less than additional 2 cps typically.

Figure 1:
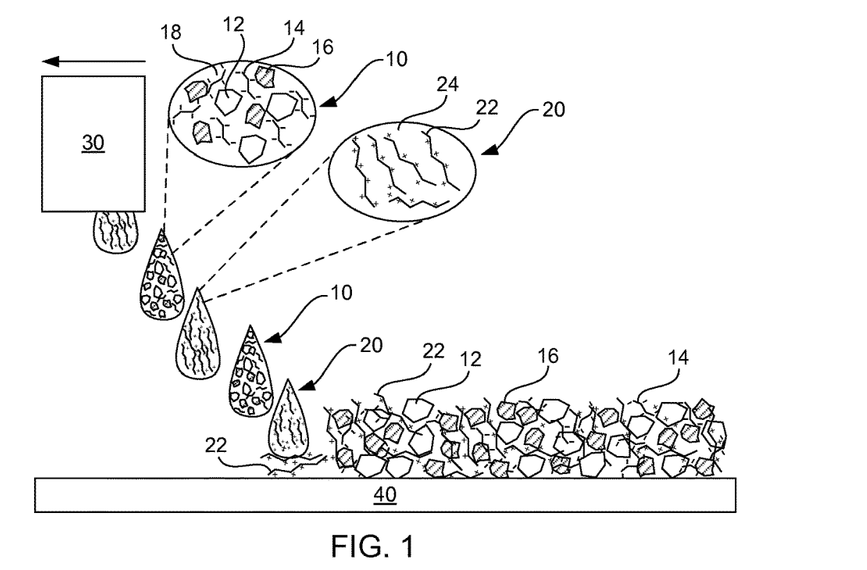
FIG. 1 depicts examples where a cationic polymer is digitally printed on a media substrate contemporaneously or just before printing a white inkjet ink thereon, and wherein the white inkjet ink is prepared in accordance with examples of the present disclosure.
Figure 2:
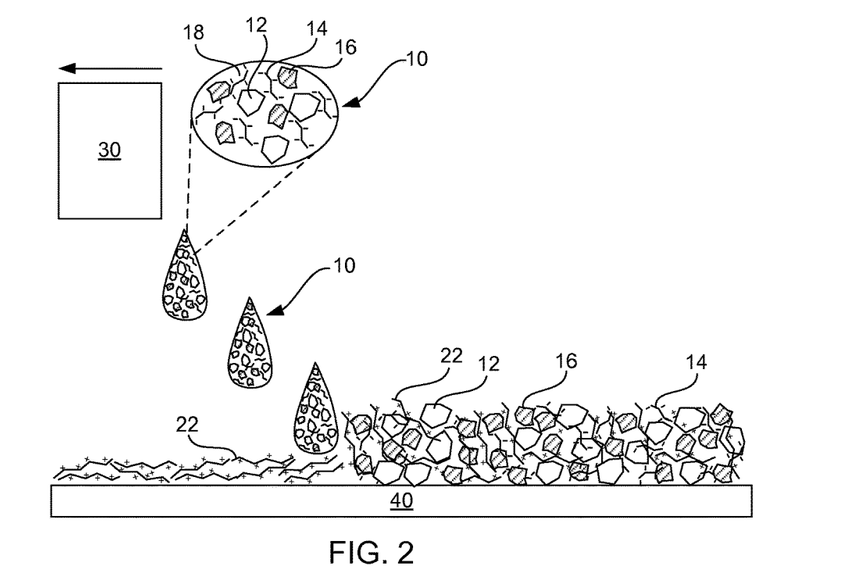
FIG. 2 depicts examples where a cationic polymer is applied to a media substrate prior to (either digital or by analog application) printing a white inkjet ink thereon, and wherein the white inkjet ink is prepared in accordance with examples of the present disclosure.

FIG. 1 depicts an example where a digitally printed fixer is applied just prior to (or essentially at the same time) as an inkjet ink of the present disclosure. FIG. 2 depicts an example where a fixer is applied to a media substrate prior to application of an inkjet ink. The fixer in this latter example can likewise be applied by digital printing, or alternatively, by analog application, e.g., roller, curtain coating, blade coating, Meyer rod coating, or any other coating methodology suitable for producing thin layer of fixer on the printed substrate, etc. As shown in FIGS. 1 and 2, an inkjet printing device 30 is adapted to digitally print a white inkjet ink 10, and in some examples, a fixer composition 20, on a media substrate 40. The media substrate can be a smooth, non-porous polymer substrate that is otherwise difficult to print on with high image quality and high durability. Specifically, FIG. 1 shows the fixer composition being printed digitally from the printing device, and FIG. 2 shows the fixer composition being pre-applied to the media substrate, either digitally or by an analog coating method. In both examples, the white inkjet ink includes white metal oxide pigment 12, anionic low molecular weight polymer 14, latex particulates 16, and an ink vehicle 18 which includes a non-ionic or predominantly nonionic dispersant that is present to disperse the white metal oxide pigment. The non-ionic or predominantly non-ionic dispersant can be used to disperse the white metal oxide pigment, such as by milling, prior to combining with some or all of the other ingredients. Water, organic solvent, and/or other ingredients can likewise be present in the ink vehicle. The fixer composition can include cationic polymer 22 that is interactive with the anionic low molecular weight polymer of the white ink, thereby providing some immobilization or freezing of the pigment and particles on the print media substrate.

Figure 3:
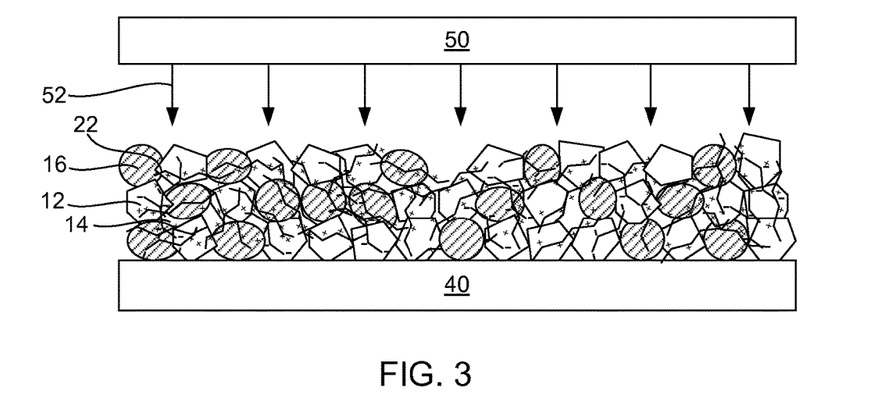
FIG. 3 depicts examples of heat fusing an image printed in as described in FIG. 1 or 2 in accordance with examples of the present disclosure.
Figure 4:
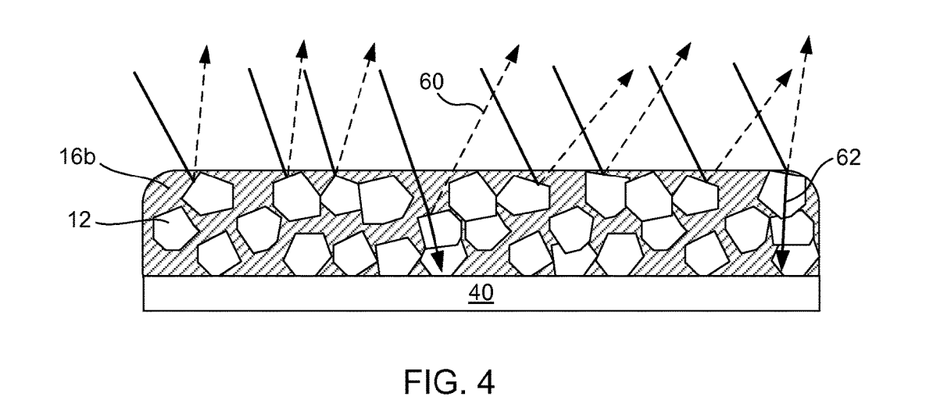
FIG. 4 depicts a printed article, such as that shown in FIG. 3, after heat fusing on the media substrate.

In another example, the image printed or otherwise generated in accordance with FIGS. 1 and 2 can be heat fused. More specifically, FIG. 3 shows a heat fusing device 50 which is used to apply heat 52, and optionally pressure, to the printed article to form a heat fused printed article as shown in FIG. 4. Because of the presence of both the white metal oxide pigment 12 and the latex particulates 16,16b appropriately spaced, there can be enhanced light scattering 60 and lower transmittance 62 than even more densely packed white metal oxide pigment, which thus provides enhanced opacity. This increased opacity can be achieved by optically spacing the white metal oxide pigment from one another. For example, drying of the inks without latex particulates such that all of the high refractive index particulates are in close contact leads to formation of a densely packed layer of the white metal oxide pigment, which reduces their light scattering ability and overall opacity. On the other hand, using the fusible latex particulates as shown, and typically applying heat to fuse the latex particulates, the low refractive index optical spacing can boost the opacity of the printed coating by from 0.1% to 25%, or more typically from 5% to 20% or from 5% to 25%. In other words, the crowding effect of tightly-packed high refractive index (n) particulates with little or no voids decreases light scattering and increase transparency of the coating. By optically spacing the white metal oxide pigment with the low refractive index latex particulates (and typically heat fusing after printing) an increase in opacity can be realized. As a further point, fusion can add enhanced durability to the printed article. In some cases, the fusing of the latex particulates may help the latex polymer distribute more evenly between light scattering white metal oxide pigment and, hence, further improve opacity as well.

As a note, in FIG. 4, the latex particulates, cationic polymer, and anionic low molecular weight polymer are not shown as separate and distinct components as shown in FIG. 3, due primarily to the heat fusion. That being mentioned, depending on the temperature and pressure applied, these respective polymers may retain some of their original form (not shown) in some examples.

In accordance with this, a printed article can include up to 75 gsm, or up to 50 gsm of total fluids (white ink+fixer) applied to a media substrate. The term "up to 75 gsm" or "up to 100 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 50 gsm. In one example, full density inked area may be at from 30 gsm to 50 gsm ink/fixer film, but densities lower in the tone ramp will be lower than this, thus the use of the phrase "up to" 75 gsm or "up to" 50 gsm. That being stated, though some areas on a media substrate might be at 0 gsm under this definition (unprinted areas), there will be areas that are imaged that range from greater than 0 gsm up to 50 gsm (after drying or heat fusing). In a typical printed article, there is a portion of the media that can be printed at from 5 gsm to 50 gsm.

Turning now to the various specific ingredients that are present in the white ink, there can be a white metal oxide pigment. The "white" pigment provides much of the white coloration to the ink, though without the other ingredients in the ink, the pigment may have some transparency or translucency. Examples of white metal oxide pigments that can be used include titanium dioxide particulates, zinc oxide particulates, zirconium oxide particulates, combinations thereof, or the like. Pigments with high light scatter capabilities, such as these, can be selected to enhance light scattering and lower transmittance, thus increasing opacity. White metal oxide pigments can have a particulate size from about 100 nm to about 2000 nm, and more typically, from about 125 nm to 700 nm, and in still another example, from about 150 nm to 500 nm. The combination of these pigments within these size ranges, appropriately spaced from one another with ingredients such as latex, full opacity can be achieved at relatively thin thickness, e.g., 5 gsm to 50 gsm after removal of water and other solvent(s) from the printed ink and fixer film.

The white metal oxide pigment, among other solids that may be present, can be dispersed using a non-ionic dispersing agent. Suitable non-ionic dispersing agents can allow for suitable dispersibility and stability in an aqueous ink environment, while having little to no impact on the viscosity of the liquid phase of the ink as well as retaining good printhead reliability in thermal inkjet printheads. Dispersants meeting these parameters are typically non-ionic or predominantly non-ionic (only weakly anionic) in character. For definitional purposes, these dispersants are referred to as non-ionic dispersants, provided they are non-ionic or predominantly non-ionic in nature, i.e. the acid number of the predominantly non-ionic/weak anionic dispersant, per dry polymer, is not higher than 100 mg KOH/g, and is typically less than 50 mg KOH/g, or even less than 30 mg KOH/g. That being state, in one example, non-ionic dispersing agent with no anionic properties can be used one example.

Examples of non-ionic dispersants that are included in this definition are water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk®-190 and Disperbyk®-199 available from BYK Chemie, as well as Dispersogen® PCE available from Clariant.

In further detail regarding the dispersants that can be used, in one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse white metal oxide pigment can be a polyether alkoxysilane or polyether phosphate dispersant. Upon dissolution in water with the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the white metal oxide pigment. This coating can increase the hydrodynamic radius of the particulates and thus reduce their effective density and settling rate. Furthermore, the dispersant coating prevents agglomeration of the white metal oxide pigment upon settling so that when sediment and settling does occur over time in the ink formulations, the settled white metal oxide pigment remain fluffy and thus are easy to re-disperse upon agitation. In still further detail, these dispersants have a relatively short chain length and do not contribute significantly to the ink viscosity, even with relatively high metal oxide particulate loads, e.g. over 30 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —Si(OR)$_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few highly practical examples, structures with —Si(OR)$_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the white metal oxide pigment. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse white metal oxide pigment can be represented by the following general Formula (I):

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —OCH$_3$ and —OCH$_2$CH$_3$. In some examples, $R^1$, $R^2$ and $R^3$ are linear alkoxy groups having from 1 to 5 carbon atoms. In some other examples, $R^1$, $R^2$ and $R^3$ groups are —OCH$_3$ or —OC$_2$H$_5$.

b) PE is a polyether oligomer chain segment of the structural formula [(CH$_2$)$_n$—CH(R)—O]$_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment ($-CH_2CH_2-O-$), or polypropylene glycol (PPG) chain segment ($-CH_2-CH(CH_3)-O-$), or a mixture of both types. In some examples, the polyether chain segment (PE) contains PEG units ($-CH_2CH_2-O-$); and c) $R^4$ is hydrogen, or a linear or a branched alkyl group. In some examples, $R^4$ is an alkyl group having from 1 to 5 carbon atoms.

Other examples of dispersants used to disperse white metal oxide pigment can include polyether alkoxysilane dispersants having the following general Formula (II):

(II)

wherein R', R" and R' are linear or branched alkyl groups. In some examples, R', R" and R' are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n-CH-R-O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the white metal oxide pigment present in the ink composition is dispersed with polyether alkoxysilanes. Examples of suitable polyether alkoxysilanes include $(CH_3O)_3Si-(CH_2CH_2O)_{n'}H$; $(CH_3CH_2O)_3Si-(CH_2CH_2O)_{n'}H$; $(CH_3O)_3Si-(CH_2CH_2O)_{n'}CH_3$; $(CH_3CH_2O)_3Si-(CH_2CH_2O)_{n'}CH_3$; $(CH_3O)_3Si-(CH_2CH_2O)_{n'}CH_2CH_3$; $(CH_3CH_2O)_3Si-(CH_2CH_2O)_{n'}CH_2CH_3$; $(CH_3O)_3Si-(CH_2CH(CH_3)O)_{n'}H$; $(CH_3O)_3Si-(CH_2CH(CH_3)O)_{n'}CH_3$; $(CH_3CH_2O)_3Si-(CH_2CH(CH_3)O)_{n'}H$; $(CH_3CH_2O)_3Si-(CH_2CH(CH_3)O)_{n'}CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest® A-1230 manufactured by Momentive Performance Materials, and Dynasylan® 4144 manufactured by Evonik/Degussa.

The amount of dispersant used to disperse the white metal oxide pigment and other solids may vary from about 1% by weight to about 300% by weight of the white metal oxide pigment content. In some examples, the dispersant content range is from about 2 to about 150% by weight of the white metal oxide pigment content. In some other examples, the dispersant content range is from about 5 to about 100% by weight of the white metal oxide pigment content.

A dispersion of white metal oxide pigment suitable for forming the white inks of the present disclosure can be prepared via milling or dispersing metal oxide powder in water in the presence of suitable dispersants. For example, the metal oxide pigment dispersion may be prepared by milling commercially available pigment having large particulate size (in the micron range) in the presence of the dispersants described herein until the desired particulate size is achieved. The starting dispersion to be milled can be an aqueous dispersion with solid content up to 65% by weight of the white metal oxide pigment or pigments. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd. The milling duration, rotor speed, and/or temperature may be adjusted to achieve the dispersion particulate size desired.

Turning now to the anionic low molecular weight polymer that is included in the white inks of the present disclosure, this component is typically dissolved in the ink vehicle of the white ink. As mentioned, the function of the anionic low molecular weight polymer is to immobilize pigment efficiently immediately after contact between the white ink with a cationic fixer polymer. Not very much anionic low molecular weight polymer is used to achieve this immobilization, e.g., from 0.02 wt % to 2 wt %, or from 0.05 wt % to 0.9 wt %.

Introduction of the anionic low molecular weight polymer into the white ink is carried out so as to not introduce a significant viscosity increase. For example, after the anionic low molecular weight polymer addition to the white ink, the ink will typically remain in the range of about the same viscosity to about 2 cps higher than the ink formulation without the anionic low molecular weight polymer (i.e. typically, the lower increase is the better). Raising the viscosity more that 2 cps can still be functional, depending on the initial ink viscosity, so this range should not be considered limiting. The amount of anionic low molecular weight polymer which can be added in the white ink can be dependent on its chain length (i.e. its molecular mass (M) which is related to weight average molecular weight (Mw)). Higher M value polymers enable more robust fixer reactivity and more efficient pigment immobilization by fixer, but their amount which can be added to the ink without substantial viscosity increase is also lower. Thus, when selecting an anionic low molecular weight polymer with a higher M value or high molecular weight, there may be advantages to using less. Likewise, when selecting an anionic low molecular weight polymer with a low M value or low molecular weight, there may be advantages to using more. Exemplary weight average molecular weights that selected can be within the ranges from 3,000 Mw to 50,000 Mw, from 3,000 Mw to 25,000 Mw, or from 4,000 Mw to 10,000 Mw.

Types of anionic low molecular weight polymer which can be used in the white ink formulations are diverse. As an initial point, the anionic low molecular weight polymer typically has a negative charge, which can be quantified as having an acid number (content of hydrophilic acidic moieties in its polymer chain) that is high enough to make the anionic low molecular weight polymer well soluble in an aqueous phase of the white ink. To illustrate, these anionic low molecular weight polymers are generally efficient at immobilizing white metal oxide pigments in ink formulations (in contact with fixer) when the acid number (AN) is above 100 mg KOH/g, above 150 mg KOH/g, or above 180 mg KOH/g, based on dry polymer weight.

Examples of such anionic low molecular weight polymer that can be used include, but are not limited to, styrene-acrylic acid copolymers such as Joncryl® 296, Joncryl® 671, Joncryl® 680, Joncryl® 683, or Joncryl® 690, available from BASF, as well as water soluble styrene-maleic anhydride co-polymer resins. Other co-polymers can also be selected for use, including copolymers of carboxylic acid monomer with some hydrophobic monomer copolymerized therewith. Co-polymers of carboxylic acid monomers with other water-soluble non-carboxylic acidic monomer moieties such as sulfonates, styrenesulfonates, phosphates, and so on, can also be used. Examples of such dispersants include, but are not limited to, Carbosperse® K-775 or Carbosperse® K-776 (co-polymers of acrylic and sulfonic acid), as well as Carbosperse® K-797, Carbosperse® K-798, or Carbosperse® K-781 (co-polymers of acrylic, sulfonic acid and styrenesulfonic acid), available from Lubrizol Corp. Other examples can include, for example, linear acrylic and methacrylic acids homopolymers, such as polyacrylic acid (PAA), polymethacrylic acid (PMAA), or their salts. More specific examples can include Carbosperse K-7058 (PAA with M~7,300), Carbosperse K-732 (PAA with M~6,000), or Carbosperse K-752 (Na salt of PMAA with M~5,000), all available from Lubrizol Corporation. Other examples can include Dispex® AA 4935 (available from BASF Dispersions & Pigments Division), Tamol 945 (water-soluble polycarboxylic acid available from "Dow Chemical").

There can also be advantages to adding the latex particulates to the inks of the present disclosure. For example, by combining white metal oxide pigment with latex particulates, opacity can be increased, even though latex does not have a high refractive index. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particulates with a relatively lower refractive index (e.g., from 1.3 to 1.6), the opacity of the ink when printed on a media sheet can be unexpectedly increased compared to an ink without the added latex particulates (even when the latex is replaced with an equivalent concentration of white metal oxide pigment).

In further detail, in providing some optical spacing between white metal oxide pigment particles by interposing latex particulates there between, opacity can be increased compared to inks without the latex particulates present. In other words, a layer of more densely packed high refractive index white metal oxide pigment can actually be less opaque (to light) than a layer of less densely packed white metal oxide pigment (e.g., pigment crowding effect). It may be considered counterintuitive because one expects better light scattering capability and opacity of coating having a higher concentration of high refractive index white metal oxide pigment. Thus, in certain examples, by decreasing the density of the white metal oxide pigment or pigment content, and replacing the pigment with essentially colorless latex particulates, such as fusible latex particulates, opacity could actually be increased.

As mentioned, the particulate size of the white metal oxide pigment can be from 100 nm to 2,000 nm, but in other examples, the particulate size can be from 125 nm to 700 nm, or from 150 nm to 500 nm. These larger sized particulates are considered to be efficient particulate sizes for light scattering when spaced appropriately by the latex particulates. The more efficient the light scattering, typically, the more opaque the printed ink layer may be (assuming appropriate spacing in the pigmented layer as described herein). Thus, the white inks of the present disclosure can be formulated such that when printed, the latex particulates provide an average space between white metal oxide pigment ranging from 20 nm to 2000 nm, in one example. In other examples, the average space between white metal oxide pigment (as provided primarily by the latex particulates) can be 50 nm to 500 nm, from 150 to 300, or in one specific example, about 220 nm to 250 nm.

In further detail, optical spacing can be experimentally determined by printing the ink on a media substrate, fusing the ink by applying heat at a temperature about 2° C. to 110° C. above the minimum film formation temperature of the latex particulates, and evaluating using Transition Electron Microscopy (TEM) cross-section photo of a printed white ink layer after drying. If the opacity provided by the white ink is not high enough, the ratio of white metal oxide pigment to latex particulates can be adjusted up or down, as effective, or the thickness of the ink can be increased. That being stated, an advantage of the white inks of the present disclosure is that in some instances, thickness does not need to be increased to increase opacity. For example, by appropriately spacing the white metal oxide pigment with the latex particulates, opacity can be boosted from 0.1% to 25%, and more typically, from 5% to 25%.

In addition to assisting with enhanced opacity, as briefly mentioned, the latex particulates can also provide enhanced durability. More specifically, the use of latex particulates, including fusible latex particulates that are thermally or otherwise cured after printing on the media substrate, can provide added durability to the printed image. Thus, the latex can provide the dual role of enhancing opacity by appropriately spacing the white metal oxide pigment, and can also provide durability on the printed media sheet. This is particularly the case in examples where there may be high metal oxide particulate loads that are dispersed by appropriate dispersing agents. Films formed by hard ceramic particulates (such as high refractive index metal oxides on surface of low porosity and non-porous media substrates) in absence of any binder material tend to have very poor mechanical properties. The film-forming behavior of latex particulates described herein can bind the relatively large white metal oxide pigment (with dispersing agent present in the ink) into continuous coating that can be very durable. Additionally, as mentioned, the low refractive index of the polymer film creates low refractive index or "n" domains, i.e. optical spacers between high n white metal oxide pigment, thereby simultaneously enhancing opacity of the print.

Coalescence of latex particulates into continuous phase creates low refractive index domains in the coating. The refractive index of the fused latex in the coating may range from 1.3 to 1.6, and in one example, can be from 1.4 to 1.6, or 1.4 to 1.5. The white metal oxide pigment can have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not required as long as there is enough of a difference that the opacity can be increased at least to some degree by the optical spacing and the refractive index difference.

Conditions enabling usage of the polymer latex in the white ink formulations of the present disclosure are dependent on what type of ink is being prepared. For example, for thermal inkjet printing applications, the glass transition temperature of the latex particulates may range from 0° C. to 130° C., or from 40° C. to 130° C. in some examples.

The monomers used in the latexes can be vinyl monomers. In one example, the monomers can be one or more of vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers, and hydrophobic monomers. Furthermore, monomers that can be polymerized in forming the latexes include, without limitation, styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-Vinylcaprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

Regarding the latex particulates, the latexes can have various shapes, sizes, and molecular weights. In one example, polymer in the latex particulates may have a weight average molecular weight ($M_w$) of about 5,000 $M_w$ to about 500,000 $M_w$. In one aspect, the latex particulates can have a weight average molecular weight ($M_w$) ranging from about 100,000 $M_w$ to about 500,000 $M_w$. In some other examples, the latex resin has a weight average molecular weight of about 150,000 $M_w$ to 300,000 $M_w$.

Further, the average particulate diameter of the latex particulates can be from about 10 nm to about 1 µm; in some other examples, from about 10 nm to about 500 nm; and, in yet other examples, from about 50 nm to about 300 nm. The particulate size distribution of the latex is not particularly limited, and either latex having a broad particulate size distribution or latex having a mono-dispersed particulate size distribution may be used. It is also possible to use two or more kinds of latex particulates each having a mono-dispersed particulate size distribution in combination.

The white inks described herein are very useful for inkjet application, even thermal inkjet applications. In one example, a reactive hydrophilic alkoxysilane dispersant can be used to assist in particulate dispersion and jettability. In some specific examples, inkjet printing of white coatings or patterns with adequate opacity (>50-60%) can benefit from a relatively high pigment load (e.g. white metal oxide pigment above 2 wt %, above 5 wt %, above 8 wt %, etc.). Jetting of high pigment load (particularly with other solids) inks becomes challenging even for piezo printheads. However, with the use of an appropriate dispersant, such as the non-ionic or predominantly non-ionic dispersants described herein, more reliable performance of higher metal oxide particulate loads printed from thermal inkjet printheads with low nominal drop weight (as low as 10 ng, or even as low as 5 ng) can be realized.

The white inks of the present disclosure also include an aqueous ink vehicle. As used herein, "ink vehicle" refers to the liquid fluid in which the white metal oxide pigment and the latex particulate are dispersed to form an ink. Ink vehicles are known in the art, and a wide variety of ink vehicles may be used with the systems and methods of the present technology. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry other solid additives as well, such as polymers, UV curable materials, plasticizers, etc. Additionally, the term "aqueous ink vehicle" refers to a liquid vehicle including water as a solvent. In one aspect, water can include a majority of the liquid vehicle.

Turning now to the fixer fluid that may be used with the white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight ($M_w$) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 $M_w$, and in one aspect, less than 50,000 $M_w$. In another example, cationic polymers can have high charge densities to improve fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one material that can be used is Floquat® FL2350, a quaternized polyamine derived from epichlorohydrin and dimethyl amine, commercially available from SNF Inc.

Typical ink vehicle or fixer vehicle formulations described herein can include water and other ingredients, depending on the application method desired for use. For example, when jetting the ink or fixer, the formulation may include co-solvents present in total at from 0.1 wt % to 30 wt %, though amounts outside of this range can also be used. Further, surfactants can be present, ranging from 0.01 wt % to 10 wt %. The balance of the formulation can further include or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives known to those skilled in the art to modify properties of the ink as desired. Such additives can be present at from 0.01 wt % to 20 wt %.

It is noted that when discussing the present inks and/or methods, each of these discussions can be considered applicable to each of these embodiments, whether or not they are explicitly discussed in the context of that embodiment. Thus, for example, in discussing refractive index related to a composition or the opacity in the context of the white ink, such elements are also relevant to and directly supported in the context of the methods described herein, and vice versa.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other know, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, printed articles, and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present inks and methods have been described above with particularity, the following examples provide further detail in connection with what are presently deemed to be the acceptable embodiments.

Example 1—Preparation of White Pigment Dispersion

A white pigment dispersion was prepared by milling $TiO_2$ pigment powder (Ti-Pure® R960 available from DuPont) in water-based slurry containing about 53 wt % of the dry pigment. Disperbyk®-190 non-ionic branched polymer X (available from BYK Chemie) was used to disperse the pigment at 1.0 wt % per dry pigment weight. The milling was carried out in a MiniCer® bead mill (available from NETZSCH Premier Technologies, LLC., Exton, Pa.) utilizing YTZ milling beads with 0.3 mm diameter. Mean particle size of the TiO$_2$ in the milled dispersion was about 260 nm as determined by NANOTRACK® particle size analyzer (Microtrack Corp., Montgomeryville, Pa.).

Example 2—Ink Formulations

Two white ink formulations were prepared, one with anionic low molecular weight polymer (Ink 1) and one without anionic low molecular weight polymer (Control Ink), as shown in Table 1 below:

TABLE 1

| Components | Control Ink wt % | Ink 1 wt % |
|---|---|---|
| 2-methyl-1,3-propanediol | 9 | 9 |
| 2-Pyrrolidinone | 16 | 16 |
| ¹Tergitol ® 15-S-7 (90 wt % actives) | 1 | 1 |
| ²Capstone ® FS-35 (25.3 wt % actives) | 1.98 | 1.98 |
| ¹Tergitol ® TMN-6 (90 wt % actives) | 1 | 1 |
| Acrylic binder latex (41.4 wt % actives) | 21.74 | 21.74 |
| ²Ti-Pure ® R960 TiO$_2$ (53.1 wt %) dispersed with ³Disperbyk-190 (1.0 wt % based on the TiO$_2$ content) - As Prepared in Example 1 | 28.25 | 28.25 |
| ⁴Joncryl ® 680 (10 wt % actives in solution - 4,900 Mw) | — | 2 |
| Water | 21.04 | 19.04 |
| Total | 100 | 100 |

¹Available from the Dow Chemical Company;
²Available from DuPont;
³Available from BYK Chemie; and
⁴Available from BASF.

Figure 5:
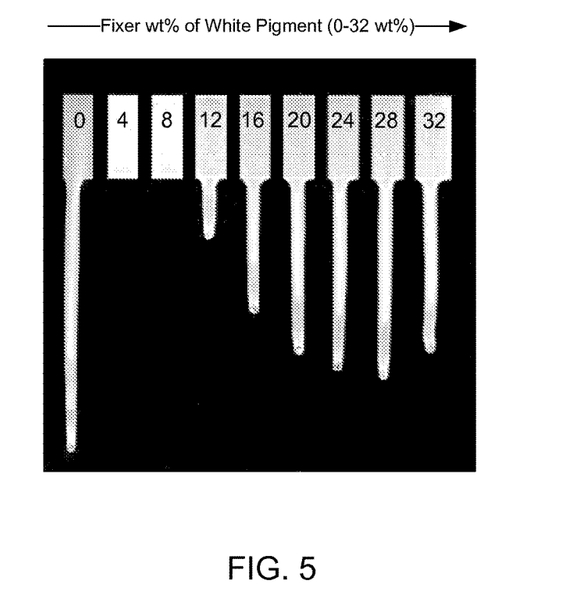
FIG. 5 is an image of a vertical drip test conducted using a Control Ink.
Figure 6:
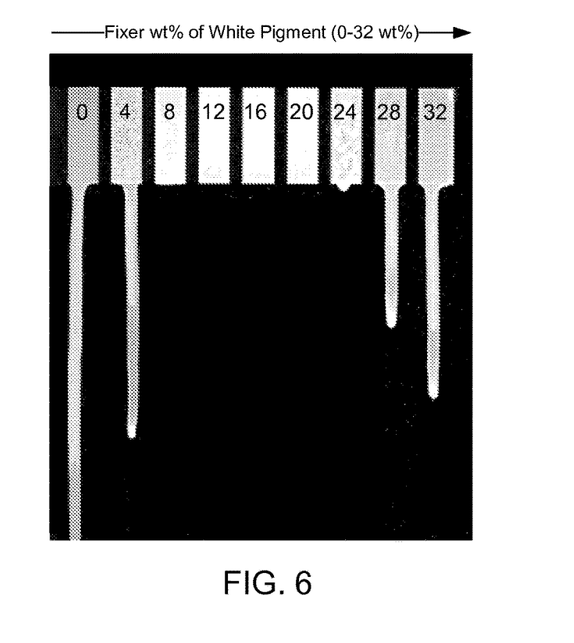
FIG. 6 is an image of a vertical drip test conducted using an ink prepared in accordance with examples of the present disclosure.

Control Ink and Ink 1 were both printed from HP 792 printhead with HP OfficeJet® 8000 printer, available from Hewlett-Packard Company. A cationic fixer including about 2.5 wt % of a Floquat® FL2350 cationic polymer (available from SNF Inc.) dissolved aqueous formulation also containing ~20 wt % of 2-pyrrolidone was jetted together with the white inks (similar to that shown in FIG. 1) from a separate printhead (HP 940). More specifically, a pattern of 9 rectangular shapes was printed with each ink and fixer combination. The print media used was signage black vinyl ("Milano" brand). Ink coverage density in the prints was about 50 gsm for white inks while fixing fluid coverage density was varying (left to right) from 0 wt % to 32 wt % (in increasing increments of 4 wt %) based on the white coverage gsm density. After printing, the media samples were positioned vertically for 5 minutes to allow the loose or non-fixed pigment to flow down the print surface. The prints were then manually dried and cured by heat gun at temperature ~100-120° C. for 3 minutes. The results of the test are shown in FIGS. 5 and 6. FIG. 5 is an image of the printed rectangles and associated ink flow from each rectangle for the Control Ink, and FIG. 6 is an image of the printed rectangles and associated ink flow from each rectangle for Ink 1.

As can be seen, the impact of the anionic low molecular weight polymer with respect to the cationic fixer and associated reactivity of inks with non-ionically dispersed TiO$_2$ pigment exhibited no vertical running over the entire range from 8 wt % to 24 wt % of cationic fixer fluid flux density. Conversely, only a narrow window of 4 wt % to 8 wt % of cationic fixer fluid flux density exhibited no vertical running for the Control ink. In other words, the Control Ink without the added anionic low molecular weight polymer had poorer fixing fluid reactivity compared to Ink 1. As a note, Disperbyk®-190 is a polymeric non-ionic dispersant with a little of anionic functionality, and thus, the TiO$_2$ pigment dispersed by the Disperbyk®-190 is only immobilized within very narrow fixer/ink ratio window, i.e. 4 wt % to 8 wt %. See FIG. 5. Adding just 0.2 wt % Joncryl® 680 caused the ink to gel within a much wider range. See FIG. 6. This indicates that the addition of even a rather small amount of soluble anionic low molecular weight polymer compared to the amount of non-ionic dispersed white pigment can dramatically improve its fixing robustness.

There are several reasons why this improvement provides advantages in the inkjet arts. White inks with high content of non-ionically dispersed TiO$_2$ pigment tend to have better jetting reliability than the ones dispersed by anionic polymer dispersants. Thus, the non-ionically dispersed pigment can retain those benefits, which are even more pronounced at small drop volume printheads, e.g., thermal inkjet printheads. At the same time, with just a small amount of anionic low molecular weight polymer, fixing properties and print quality can be improved fairly significantly.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A white ink, comprising:
   an aqueous ink vehicle;
   from 5 wt % to 50 wt % of a white metal oxide pigment having an average particulate size from 100 nm to 2,000 nm, and being dispersed by a non-ionic or predominantly non-ionic dispersant having an acid number not higher than 100 mg KOH/g based on dry polymer weight;
   from 0.02 wt % to 2 wt % of an anionic low molecular weight polymer having a weight average molecular weight of 3,000 Mw to 50,000 Mw and an acid number higher than 100 mg KOH/g based on dry polymer weight; and
   from 2 wt % to 30 wt % of latex particulates having a glass transition temperature from 0° C. to 130° C.

2. The white ink of claim 1, wherein the white metal oxide pigment includes titanium dioxide particulates, zinc oxide particulates, zirconium oxide particulates, or combinations thereof.

3. The white ink of claim 1, wherein the white metal oxide pigment has an average particulate size from 150 nm to 500 nm.

4. The white ink of claim 1, wherein the anionic low molecular weight polymer is present at from 0.05 wt % to 0.9 wt %.

5. The white ink of claim 1, wherein the anionic low molecular weight polymer has a weight average molecular weight of 4,000 Mw to 10,000 Mw.

6. The white ink of claim 1, wherein the white metal oxide pigment and latex particulates are present in the white ink at a weight ratio from 6:1 to 1:3.

7. The white ink of claim 1, wherein the latex particulates have a glass transition temperature from 40° C. to 130° C.

8. The white ink of claim 1, wherein the non-ionic dispersant has an acid number of 30 mg KOH/g or less.

9. The white ink of claim 1, wherein the non-ionic or predominantly non-ionic dispersant is a hydrophilic alkoxysilane dispersing agent, a water-hydrolysable silane coupling agents with oligomer length range polyether chains, or a low-to-midrange branched co-polymer of comb-type structure with polyether pendant chains and acidic anchor groups attached to its backbone.

10. The white ink of claim 1, wherein the white ink is a thermal inkjet ink.

11. A method of making a white ink, comprising:
milling a white metal oxide pigment in a water-based carrier with a non-ionic or predominantly non-ionic dispersing agent to form a white metal oxide pigment dispersion, wherein the non-ionic or predominantly non-ionic dispersant is defined by having an acid number not higher than 100 mg KOH/g based on dry polymer weight; and
admixing with the white metal oxide pigment dispersion: water, organic co-solvent, anionic low molecular weight polymer having a weight average molecular weight of 3,000 Mw to 50,000 Mw and an acid number higher than 100 mg KOH/g based on dry polymer weight, and
latex particulates, to form a white ink.

12. The method of claim 11, wherein the white ink, comprises:
from 5 wt % to 50 wt % of the white metal oxide pigment having an average particulate size from 100 nm to 2,000 nm;
from 0.02 wt % to 2 wt % of the anionic low molecular weight polymer; and
from 2 wt % to 30 wt % of latex particulates having a glass transition temperature from 0° C. to 130° C.

13. A white thermal inkjet ink, comprising:
an aqueous inkjet ink vehicle;
from 10 wt % to 35 wt % of a $TiO_2$ pigment having an average particulate size from 150 nm to 500 nm, wherein the $TiO_2$ pigment is dispersed with a non-ionic or predominantly non-ionic dispersant having an acid number not higher than 30 mg KOH/g based on dry polymer weight; and
from 0.02 wt % to 2 wt % of an anionic low molecular weight polymer having a weight average molecular weight of 3,000 Mw to 50,000 Mw and an acid number higher than 150 mg KOH/g based on dry polymer weight.

14. The white thermal inkjet ink of claim 13, further comprising from 2 wt % to 30 wt % of latex particulates having a glass transition temperature from 0° C. to 130° C.

15. The white thermal inkjet ink of claim 13, wherein the anionic low molecular weight polymer is present at from 0.05 wt % to 0.9 wt %, and has a weight average molecular weight of 4,000 Mw to 10,000 Mw.

16. The method of claim 11, wherein the white metal oxide pigment includes titanium dioxide particulates, zinc oxide particulates, zirconium oxide particulates, or combinations thereof.

17. The method of claim 11, wherein the white metal oxide pigment includes titanium dioxide particulates.

18. The method of claim 11, wherein the white metal oxide pigment has an average particulate size from 150 nm to 500 nm.

19. The method of claim 12, wherein the anionic low molecular weight polymer is present in the white ink at from 0.05 wt % to 0.9 wt %, and has a weight average molecular weight of 4,000 Mw to 10,000 Mw.

20. The white thermal inkjet ink of claim 13, wherein the white metal oxide pigment and latex particulates are present in the white ink at a weight ratio from 6:1 to 1:3.

* * * * *

UNITED STATES PATENT AND TRADEMARK OFFICE
CERTIFICATE OF CORRECTION

PATENT NO. : 10,167,400 B2
APPLICATION NO. : 15/544301
DATED : January 1, 2019
INVENTOR(S) : Paul Joseph Bruinsma et al.

Page 1 of 1

It is certified that error appears in the above-identified patent and that said Letters Patent is hereby corrected as shown below:

On the Title Page

In Column 1, item (73), Assignee, Line 1, delete "Hewlett Packard Development" and insert -- Hewlett-Packard Development --, therefor.

Signed and Sealed this
Twenty-fifth Day of June, 2019

Andrei Iancu
*Director of the United States Patent and Trademark Office*